3,150,072
CATALYST DEMETALLIZATION
William B. Watson, Park Forest, Ill., and Leon M. Lehman, Brooklyn, N.Y., assignors, by mesne assignments, to Sinclair Research, Inc., New York, N.Y., a corporation of Delaware
No Drawing. Filed Nov. 28, 1960, Ser. No. 71,908
2 Claims. (Cl. 208—46)

This invention is a method for the catalytic conversion of a hydrocarbon feedstock containing a nickel contaminant by contact of the feedstock at an elevated temperature with a synthetic gel silica-based catalyst wherein nickel deposits on the catalyst. The invention includes continuous removal of a portion of catalyst from the conversion system and demetallizing the catalyst, usually through contact with a vapor reactive with the nickel deposited on the catalyst, and return of the catalyst to the conversion system. It has been found that the portion of catalyst removed from the system per day for demetallization should be enough so that the sum of the tons of catalyst lost from the system per day and the product of the tons of catalyst demetallized per day times the fraction of nickel removed in the demetallization is at least about 0.8 times the pounds of nickel introduced with the feedstock to the conversion each day, measured as nickel oxide, if the level of metal poisons on the catalyst is to be maintained within the tolerance of the conversion unit for poisons. Also, the sum mentioned above is preferably not greater than 8 times the pounds of nickel introduced with the feedstock to the conversion each day, that is, a demetallization unit used with the conversion apparatus need have a capacity not greater than is needed to handle this rate of catalyst for adequate control of metal poisons on the catalyst. It has been found that when the feedstock also contains iron and/or vanadium poisons and procedures are included in the processing system for removal of one or both of these latter metal poisons from the catalyst, that the demetallization rate described above and based on nickel removal is sufficient also to keep iron and/or vanadium levels on the catalyst within tolerable limits.

The optimum demetallization rate may be given by the relationships:

$$\sim 8A \geq D + eT \geq 0.8A$$

or $$T = \frac{-D}{e} + \frac{nF}{e}(.00143 \pm B)$$

or $$\frac{1}{e}(0.0026nF - D) \geq T \geq \frac{1}{e}(0.00026nF - D)$$

where $A$ = pounds of NiO introduced with feed $\cong 0.00032nF$
$B$ = 0 to 0.00117
$D$ = tons of catalyst lost from the system per day by discard, stack losses, etc.
$e$ = efficiency of demetallization; fraction of NiO removed from catalyst in demetallization
$F$ = barrels of fresh feed sent to the conversion unit per day
$n$ = parts per million of NiO in feed, and
$T$ = tons of catalyst demetallized per day, with the proviso that the demetallization rate is about 0.01 to 0.5% of the catalyst circulation rate.

The catalyst circulation rate is the amount of catalyst which goes from the reactor to the regenerator per unit of time. It may be measured by the amount of catalyst which passes a given point in the conversion system, for example, the entrance to or exit from the regenerator standpipe, in a given length of time.

Large quantities of mineral oil petroleum crudes, fractions thereof, and by hydrocarbon derived therefrom, contain harmful amounts of metal impurities, such as nickel, vanadium and iron. These impurities are frequently present in such large amounts that utilization of the hydrocarbon is a real problem since the metals accumulate on catalysts in conversion processes, e.g., cracking, adversely affecting the product distribution of cracking yields by increasing coke and gas make and decreasing gasoline make. Thus catalytic cracking of the hydrocarbons is uneconomical because the metal impurities harmfully affect selectivity of the catalyst. For this reason, such stocks have not heretofore been utilized to the fullest possible extent.

One of the most important phases of study in the improvement of catalyst performance in hydrocarbon conversion is in the area of metals poisoning. Although referred to as "metals," these catalyst contaminants may be in the form of free metals or relatively non-volatile metal compounds. It is to be understood that the term "metal" used herein refers to either form. Various petroleum stocks have been known to contain at least traces of many metals. For example, Middle Eastern crudes contain relatively high amounts of several metal components, while Venezuelan crudes are noteworthy for their vanadium content and are relatively low in other contaminating metals such as nickel. In addition to metals naturally present, including some iron, petroleum stocks have a tendency to pick up tramp iron from transportation, storage and processing equipment. Because most of these metals, when present in a stock, deposit in a relatively non-volatile form on the catalyst during the conversion processes and regeneration of the catalyst to remove coke does not remove these contaminants, such feeds are generally avoided. Iron, nickel, vanadium and copper, for example, markedly alter the selectivity and activity of cracking reactions if allowed to accumulate, producing a higher yield of coke and hydrogen at the expense of desired products, such as gasoline and butanes.

Solid oxide catalysts, both naturally occurring activated clays and synthetically prepared gel catalysts, as well as mixtures of the two types, have long been recognized as useful in catalytically promoting conversion of hydrocarbons. A popular "natural" catalyst is "Filtrol" which is acid-activated montmorillonite. For cracking processes, the solid oxide catalysts which have received the widest acceptance today are usually activated or calcined predominantly silica or silica-based, e.g. silica-alumina, silica-magnesia, silica-zirconia, etc., compositions in a state of slight hydration and containing small amounts of acidic oxide promoters in many instances. In this invention the oxide catalyst may be alumina- or silica-based and ordinarily contains a substantial amount of a gel or gelatinous precipitate comprising a major portion of silica and at least one other material, such as alumina, zirconia, etc. The use of wholly or partially synthetic gel catalysts, which are more uniform and less damaged by high temperatures in treatment and regeneration, is preferable. Popular synthetic gel cracking catalysts generally contain about 10 to 30% alumina. Two such catalysts are "Aerocat" which contains about 13% $Al_2O_3$, and "High Alumina Nalcat" which contains about 25% $Al_2O_3$, with substantially the balance being silica. The catalyst may be only partially of synthetic material; for example it may be made by the precipitation of silica-alumina on clay, such as kaolinite or halloysite. One such semi-synthetic catalyst contains about equal amounts of silica-alumina gel and clay.

The physical form of the catalyst varies with the type of manipulative process to which it will be exposed. In fluid catalytic processes gases are used to convey the catalyst in the form of a fine powder, generally in a size range of about 20 to 150 microns. In the "TCC" or "Thermofor" process the catalyst is in the form of beads which are conveyed by elevators. Generally these beads may range in size up to about ½" in diameter. When fresh, the minimum sized bead is generally about ⅛". Other types of process use other forms of catalyst such as tablets or extruded pellets. The cracking process of this invention preferably uses the fluidized solids technique. In any process which uses a solid catalyst, and especially in processes involving moving beds of catalyst, attrition causes a certain amount of catalyst to become so subdivided that it may be carried off in exhaust vapors from the catalyst bed. Generally, no attempt is made to recover extremely small catalyst particles and frequently it is desired to discard such fines which generally are exhausted of catalytic activity by the time they have been reduced to such small size. The amount of catalyst intentionally or unintentionally removed from the system is, of course, continually replaced. This replacement rate may frequently be in the range of about 0.05 to 5 pounds of catalyst per barrel of hydrocarbon fed to cracking. In prior art processes where a metals poisoning problem is encountered, the catalyst discard rate is increased to keep the average poison content of the catalyst within the tolerance of the cracking system for poison. In this invention, however, the discard rate need only be enough to rid the system of catalyst which is physically beyond rehabilitation or is unavoidably lost.

The feeds to the present process generally comprise petroleum fractions boiling in the gas-oil range or above which may be exemplified by various crude or pretreated distillate or residual fractions such as vacuum residua, atmospheric residua, tars, pitches, etc., boiling essentially above about 400° or even above about 600° F., and will in general contain greater amounts of poisoning metals than the amounts found in feedstocks to conventional cracking processes. The feedstock may contain refractory cycle stock usually boiling between about 400° F. and about 850–950° F. or the feed may be the entire portion of the residual remaining after the light ends (the portion boiling up to about 400° F.) have been removed; therefore, such a fraction may include the entire gas oil fraction (400° F. to 1100–1200° F.) and the undistilled portion of the residual boiling above about 1100–1200° F. The feed often has an API gravity in the range of about 0° to 25°, a Conradson carbon content in the range of about 3 to 35 weight percent and a viscosity up to about 75 or even 200 seconds Saybolt Furol at 210° F. or more. These charge stocks, containing more than about 1.5 parts per million of vanadium and/or more than about 0.6 part per million of nickel are generally avoided in cracking processes and most refiners prefer less than about 0.5 part per million of vanadium or about 0.2 part per million of nickel in the cracking stock. Iron is generally in the feedstock in proportions of at least about 0.3 p.p.m. Metal contents above these ranges may be present in feeds to the process of this invention; it will be apparent that oils having metal contents in these generally undesirable ranges are the oils which this invention salvages. A mixture of vanadium and nickel may be considered as harmful as a single metal even though the individual amounts of each metal are below the values mentioned above because the effect of the total amount of the metallic components is frequently sufficient to give harmful effects during catalytic cracking. In most cases, however, the total of one, two or three of these metals in the residual will be at least about 0.5 p.p.m. The maximum amount of metals in the residuals can vary widely; most often the maximum amount of these poisoning metals in the residual stock will not exceed about 50 p.p.m. nickel, about 100 vanadium and about 50 p.p.m. iron.

In the cracking, diluents for the feed may be employed. Such diluents include steam, other inert gases, and low end-point hydrocarbon vapors and may be as much as about 150 weight percent of the petroleum residual and when used are usually at least about 10 percent. Such vapors frequently are low octane naphthas or light gas oils or other hydrocarbons which are normally liquid but are vapors under the processing conditions.

The feed to the cracking zone is vaporized and catalytically treated under more or less conventional catalytic cracking conditions. These conditions generally include a temperature of about 850° to 1000° F., preferably about 875 to 975° F. and a pressure between about 5 and 25 p.s.i.g., at a weight hourly space velocity from about 0.1 to 10 to obtain about a 40–80 volume percent conversion of the feed to gasoline and other desired lighter components. The products of the cracking are conducted to a fractionator, with or without intermediate cooling. In the fractionation, which may be conducted under partial vacuum, the lower boiling gasoline constituents of the cracker effluent having an approximate 375°–430° F. end point are vaporized and removed from the system and may be used as gasoline blending components or other products. The liquid hydrocarbon remaining, with or without further fractionation may be recycled to the cracking conversion or removed from the system to other uses, in whole or in part.

In cracking, coke yield may be held to a minimum through the use of good steam stripping and a high steam partial pressure, and removal of coke from the catalyst is performed by regeneration. Regeneration of a catalyst to remove carbon is a relatively quick procedure in most commercial catalytic conversion operations. For example, in a typical cracking unit, a portion of catalyst is continually being removed from the reactor and sent to the regenerator for contact with air at about 950 to 1200° F., more usually about 1000 to 1150° F. Combustion of coke from the catalyst is rapid, and for reasons of economy only enough air is used to supply the needed oxygen. Average residence time for a portion of catalyst in the regenerator may be on the order of about six minutes and the oxygen content of the effluent gases from the regenerator is desirably less than about ½ percent. Regeneration puts the catalyst in a substantially carbon free state, that is the state where little, if any, carbon is burned or oxygen consumed even when the catalyst is contacted with oxygen at temperatures conducive to combustion.

In the practice of this invention demetallization is accomplished by the continuous withdrawal of contaminated catalyst from the cracking system, for example, from the regenerator standpipe. The catalyst is subjected to one or more of the demetallization procedures described hereinafter, and then the catalyst, substantially reduced in contaminating metal content is returned to the cracking system. In the treatment to take poisoning metals from the cracking catalyst a large or small amount of metal can be removed as desired. Generally, catalyst in a cracking unit can tolerate no more than about 500 p.p.m. Ni and in this case where the demetallization process removes, say, 50% of the metals, about 250 p.p.m. Ni is removed in each demetallization. Where a unit can tolerate only 50 p.p.m. nickel, 25 p.p.m. is removed each time the poisoned catalyst is sent through a demetallization unit having this 50% efficiency. The minimum tolerance of the unit for poison is determined, for example, by the loss in yield due to poisoning. When treating the catalyst it is preferred to remove at least about 10% up to about 70% or more of one or more of the metals in question. The demetallization rate, the tons of catalyst sent to demetallization each day, is, as mentioned above such that the sum of the tons of catalyst lost from the system per day and the product of the tons of catalyst demetallized per day times the fraction of nickel removed in the demetallization is from about 0.8 to 8 times the number of pounds of nickel introduced with the feedstock to the conversion each day, measured as nickel oxide, and is from 0.01 to 0.5 times the catalyst circulation rate.

A number of procedures have become available for removing nickel and other poisoning metals such as vanadium and iron from a contaminated hydrocarbon conversion catalyst. Such procedures frequently involve contact of the catalyst at elevated temperatures with vapors reactive with the poisoning metal on the catalyst and are described, for example, in copending applications Serial Nos. 763,834, filed September 29, 1958, now abandoned; 767,794, filed October 17, 1958; 849,199, filed October 28, 1959; 842,618, filed September 28, 1959, now abandoned; 19,313, filed April 1, 1960, now abandoned; 39,810, filed June 30, 1960; 47,598, filed August 4, 1960; 53,623, filed September 2, 1960; 55,838, filed September 14, 1960, now abandoned; 55,160, filed September 12, 1960; 53,380, filed September 1, 1960; 54,532, filed September 7, 1960, now abandoned; all of which are herein incorporated by reference. It has been found, for example, that Ni, Fe and V may be removed from a catalyst by converting the metals into volatile compounds; a chlorination treatment can convert iron and vanadium to volatile chlorides, as reported in copending applications Serial Nos. 849,199, filed October 28, 1959, and 54,532, filed September 7, 1960, and nickel may be converted to the volatile nickel carbonyl by hydrogenation and treatment with carbon monoxide, as pointed out in copending application Serial No. 47,598, filed August 4, 1960.

It has also been found that Ni, Fe and V may be removed from a catalyst by certain aqueous media; a basic aqueous wash containing ammonium ions is suitable for removal of V poisons as reported in copending application Serial No. 39,810, filed June 30, 1960. The removal of nickel may be accomplished by the use of a slightly acid aqueous wash when the nickel is first converted into a compound dispersible in such a wash. The chlorination treatment can convert nickel to the soluble chloride form. Also, a poisoned catalyst may be reduced in nickel content by the aqueous wash when nickel contaminants are put into the sulfate or other dispersible form of oxidizing a sulfided nickel-contaminated catalyst. Such an oxidation may be performed by an oxidizing vapor, as disclosed in copending applications Serial Nos. 763,834, filed September 29, 1958, now abandoned, and 55,129, filed September 12, 1960, or by an aqueous oxidizing agent, as explained in copending application Serial No. 842,618, filed September 28, 1959. Sulfidation of nickel poisoned catalyst appears to have important effects in making more nickel available for removal, so that sulfidation, as described in the latter two copending applications and in application Serial No. 53,380, filed September 1, 1960, may be performed when the nickel removal is by a route other than conversion to sulfate. Also, as pointed out in copending applications Serial No. 19,313, filed April 1, 1960, and Serial No. 55,160, filed September 12, 1960, a preliminary treatment of the catalyst with molecular oxygen-containing gas is of value in improving the vanadium removed by subsequent procedures. The treatment may remove a substantial part of one or more of these metals, preferably all three, or at least nickel and vanadium. Subjecting the poisoned catalyst sample to magnetic flux may be found desirable to remove any tramp iron particles which may have become mixed with the catalyst.

Treatment of the regenerated catalyst with molecular oxygen-containing gas is described in copending applications Serial Nos. 19,313, filed April 1, 1960, and 55,160, filed September 12, 1960, hereby incorporated by reference. The temperature of this treatment is generally in the range of about 1000 to 1800° F. but below a temperature where the catalyst undergoes any substantial deleterious change in its physical or chemical characteristics. The catalyst is in a substantially carbon-free condition during this high-temperature treatment and there is substantially no oxygen consumption. If any significant amount of carbon is present in the catalyst at the start of this high-temperature treatment, the essential oxygen contact is that continued after carbon removal. In any event, after carbon removal, the oxygen treatment of the essentially carbon-free catalyst is at least long enough to convert a substantial amount of vanadium to a higher valence state, as evidenced by a significant increase, say at least about 10%, preferably at least about 100%, in the vanadium removal in subsequent stages of the process. This increase is over and above that which would have been obtained by the other metals removal steps without the oxygen treatment.

The treatment of the vanadium-positioned catalyst with molecular oxygen-containing gas is preferably performed at a temperature of about 1150 to 1350 or even as high as 1600° F. and at least about 50° F. higher than the regeneration temperature. The oxygen-containing gas used in the treatment contains molecular oxygen as the essential active ingredient. The gas may be oxygen, or a mixture of oxygen with inert gas, such as air or oxygen-enriched air. The partial pressure of oxygen in the treating gas may range widely, for example, from about 0.1 to 30 atmospheres, but usually the total gas pressure will not exceed about 25 atmospheres. The factors of time, partial pressure and extent of vanadium conversion may be chosen with a view to the most economically feasible set of conditions. It is preferred to continue the oxygen treatment for at least about 15 or 30 minutes with a gas containing at least about 1%, preferably at least about 10% oxygen. The catalyst may pass directly from the oxygen treatment to an ammonia wash as described below for satisfactory vanadium removal especially where this is the only important contaminant, as may be the case when the residuum cracked is derived, for example, from Venezuelan crude.

Conversion of the metal poisons to the sulfate or other dispersible form is described in copending applications Serial No. 763,834, filed September 29, 1958, and Serial No. 842,618, filed September 28, 1959, hereby incorporated by reference, and may be accomplished, for instance, by subjecting the catalyst to a sulfating gas, that is, $SO_2$, $SO_3$ or a mixture of $SO_2$ and $O_2$, at an elevated temperature. Sulfur oxide contact is usually performed at a temperature of about 500 to 1200° F. and frequently it is advantageous to include some free oxygen in the treating gas. Another procedure includes sulfiding the catalyst and converting the sulfide by an oxidation process, after which metal contaminants in dispersible form may be removed from the catalyst by an aqueous medium.

A sulfiding can be performed by contacting the poisoned catalyst with elemental sulfur vapors, or more conveniently by contacting the poisoned catalyst with a volatile sulfide, such as $H_2S$, $CS_2$ or a mercaptan. The contact with the sulfur-containing vapor can be performed at an elevated temperature generally in the range of about 500 to 1500° F., preferably about 800 to 1300° F. Other treating conditions can include a sulfur-containing vapor partial pressure of about 0.1 to 30 atmospheres or more, preferably about 0.5 to 25 atmospheres. Hydrogen sulfide is the preferred sulfiding agent. Pressures below atmospheric can be obtained either by using a partial vacuum or by diluting the vapor with gas such as nitrogen or hydrogen. The time of contact may vary on the basis of the temperature and pressure chosen and other factors such as the amount of metal to be removed. The sulfiding may run for, say, up to about 20 hours or more depending on these conditions and the severity of the poisoning. Temperatures of about 900 to 1300° F. and pressures approximating 1 atmosphere or less seem near optimum for sulfiding and this treatment often continues for at least 1 or 2 hours but the time, of course, can depend upon the manner of contacting the catalyst and sulfiding agent, as well as the rate of diffusion within the catalyst matrix.

The sulfiding step performs the function not only of supplying a sulfur-containing metal compound which may be easily converted to the sulfate or other dispersible form but also apparently serves to concentrate some metal poisons, especially nickel, at the surface of the catalyst particle.

Oxidation after sulfiding may be performed by a gaseous oxidizing agent to convert metal sulfide to sulfate, including oxysulfate, or other dispersible form. Gaseous oxygen, or mixtures of gaseous oxygen with inert gases such as nitrogen, may be brought into contact with the sulfided catalyst at an oxygen partial pressure of about 0.2 atmosphere and upward, temperatures upward of room temperature and usually not above about 1300° F., and times dependent on temperature and oxygen partial pressure. Gaseous oxidation is best carried out near 900° F., about one atmosphere $O_2$ and at very brief contact times.

The metal sulfide may be converted to the corresponding sulfate, or other dispersible form, by a liquid aqueous oxidizing agent such as a dilute hydrogen peroxide or hypochlorous acid water solution as described in copending application Serial No. 842,618, filed September 28, 1959. Bromine, chlorine, or iodine water, or aerated, ozonated or oxygenated water, with or without acid, also will oxidize the sulfides to sulfates or other dispersible form. The inclusion in the liquid aqueous oxidizing solution of sulfuric acid or nitric acid has been found greatly to reduce the consumption of peroxide. In addition the inclusion of nitric acid in the oxidizing solution provides for increased vanadium removal. Useful proportions of acid to peroxide to catalyst generally include about 2 to 25 pounds acid (on a 100% basis) to about 1 to 30 pounds or more $H_2O_2$ (also on a 100% basis) in a very dilute aqueous solution, to about one ton of catalyst. A 30% $H_2O_2$ solution in water seems to be an advantageous raw material for preparing the aqueous oxidizing solution. Another highly advantageous oxidizing medium is an aerated dilute nitric acid solution in water. Such a solution may be provided by continuously bubbling air into a slurry of the catalyst in very dilute nitric acid. Other oxygen-containing gases may be substituted for air. The time required for oxidation is generally at least about 7 to 8 minutes. The oxidation slurry may contain about 20% solids and provide about five pounds of nitric acid per ton of catalyst. The liquid phase oxidation may also be performed by exposing the sulfided catalyst first to air and then to the aqueous nitric acid solution. The conditions of oxidation can be selected as desired. The temperature can conveniently range up to about 220° F. with temperatures of above about 150° F. being preferred. Contact with the hot catalyst may be sufficient to raise the temperature of the slurry from ambient temperature to around the boiling point. Temperatures above about 220° F. necessitate the use of superatmospheric pressures and no need for such has been found.

Sometimes removal of sulfides from the catalyst may be accomplished by contacting the catalyst with an appropriate solvent. Such procedures are described in copending application Serial No. 763,833, filed September 29, 1958, incorporated herein by reference. These solvents are in general aqueous and may contain a complexing or chelating agent for the nickel and/or other metal poisons. Aqueous solutions containing cyanide or hexametaphosphate ions are useful in forming soluble complexes with the poisoning metals. Organic sequestering agents, such as ethylene diamine tetraacetic acid (EDTA), etc. have been found useful in removing the sulfided metals since they form soluble chelate complexes with the metals and effectively retard redeposition of the poisoning metals on the catalyst surface once they are brought into solution. The liquid phase aqueous medium may be applied to the sulfided catalyst at any temperature from ambient temperature upwards. Elevated temperatures approaching the boiling point of water are preferred. Also, it has been found desirable sometimes to impart oxidation characteristics to the wash containing a chelating agent.

It has further been found that treatment of a metals-contaminated catalyst with a chlorinating agent at a moderately elevated temperature is of value in removing vanadium and iron contaminants from the catalyst as volatile chlorides. This treatment is described in copending application Serial No. 849,199, filed October 28, 1959. Generally, the major proportion of these volatile chlorides is removed during contact with the chlorinating vapor and where the volatile chlorides are insufficiently removed, a purge with an inert gas such as nitrogen at an elevated temperature may be applied to the chlorinated catalyst. A conversion to vanadium chloride after the high temperature oxygen and/or sulfiding treatment preferably makes use of vapor phase chlorination at a moderately elevated temperature wherein the catlyst composition and structure is not materially harmed by the treatment and a substantial amount of the poisoning metals content is converted to chlorides. The chlorination takes place at a temperature of at least about 300° F. to say about 1000° F., preferably about 550 to 650° F., with optimum results being obtained close to about 600° F. The chlorinating reagent is a vapor which contains chlorine, preferably in combination with carbon or sulfur. Such reagents include molecular chlorine but preferably are the chlorine substituted light hydrocarbons, such as carbon tetarchloride, which may be used as such or formed in-situ by the use of, for example, a vaporous mixture of chlorine gas with low molecular weight hydrocarbons such as methane, ethane and propane. The chlorination may take about 5 to 120 minutes, more usually about 20 to 60 minutes, but shorter or longer reaction periods may be possible or needed, for instance, depending on the linear velocity of the chlorinating and purging vapors.

Nickel poison may be removed by conversion of the nickel sulfide to the volatile nickel carbonyl by treatment with carbon monoxide, as described in copending application Serial No. 47,598, filed August 4, 1960, incorporated herein by reference. In such a procedure the catalyst is treated with hydrogen at an elevated temperature during which nickel contaminant is reduced to the elemental state, then treated, preferably under elevated pressure and at a lower temperature, with carbon monoxide, during which nickel carbonyl is formed and flushed off the catalyst surface. Some iron contaminant is also removed by this carbonylation treatment.

Hydrogenation takes place at a temperature of about 800 to 1600° F., at a pressure from atmospheric or less up to about 1000 p.s.i.g. with a vapor containing 10 to 100% hydrogen. Preferred conditions are a pressure up to about 15 p.s.i.g. and a tempertaure of about 1100 to 1300° F. and a hydrogen content greater than about 80 mole percent. The hydrogenation is continued until surface accumulations of poisoning metals, particularly nickel, are substantially reduced to the elemental state.

Carbonylation takes place at a temperature substantially lower than the hydrogenation, from about ambient temperature to 300° F. maximum and at a pressure up to about 2000 p.s.i.g., with a gas containing about 50–100 mole percent CO. Preferred conditions include greater than about 90 mole percent CO, a pressure of up to about 800 p.s.i.g. and a temperature of about 100–180° F. The CO treatment generally serves to convert the elemental metals, especially nickel and iron, to volatile carbonyls and to remove the carbonyls.

After the conversion of some of the poisoning metal to a form soluble or dispersible in an aqueous medium, the catalyst can be washed with such aqueous medium to remove metal sulfate, nitrate, etc. or the soluble metal chloride produced in the chlorination procedure described above. This aqueous wash medium will preferably be somewhat acidic, and this character can be imparted, at least initially, due to the presence of the acid-acting salt or some entrained acidic oxidizing agent on the catalyst. Ambient temperatures can be used in the wash. Pressures above atmospheric may be used but the results usually do not justify the additional equipment. Where an aqueous oxidizing solution is used, the solution may perform part or all of the metal compound removal simultaneously with the oxidation. In order to avoid undue solution of alumina from the catalyst, when the metal poisons have been converted to the chlorides, contact time is preferably held to about 3 to 5 minutes which is sufficient for nickel removal. Also, since a slightly acidic solution is desirable for nickel removal, this wash preferably takes place before an ammonium wash, hereinafter described.

Vanadium may be removed from the catalyst by washing it with a basic aqueous solution as described in copending application Serial No. 39,810, filed June 30, 1960, and incorporated herein by reference. The pH is frequently greater than about 7.5 and the solution preferably contains ammonium ions which may be $NH_4+$ ions or organic-substituted $NH_4+$ ions such as methyl ammonium and quaternary hydrocarbon radical ammoniums. An aqueous solution of ammonium hydroxide is preferred. The preferred solutions have a pH of about 8 to 11. The amount of ammonium ion in the solution is sufficient to give the desired vanadium removal and will often be in the range of about 1 to 25 or more pounds per ton of catalyst treated. Five to fifteen pounds is the preferred ammonium range but the use of more than about 10 pounds does not appear to increase vanadium removal unless it increases pH.

After a wash treatment the catalyst slurry can be filtered to give a cake which may be reslurried with water or rinsed in other ways, such as, for example, by a water wash on the filter, and the rinsing may be repeated, if desired, several times.

After demetallization, the catalyst is conducted back to the cracking system, for instance, to the hydrocarbon conversion reactor or catalyst regenerator, although it may be desirable first to dry the catalyst filter cake or filter cake slurry at say about 250 to 450° F. and also, prior to reusing the catalyst in the conversion operation it can be calcined, say at temperatures usually in the range of about 700 to 1100° F. A fluidized solids technique is recommended for the sulfiding and other vapor contact processes used in any selected demetallization procedure as a way to shorten the time requirements. After the available catalytically active poisoning metal has been removed, in any removal procedure, further reaction time may have relatively little effect on the catalytic activity of the depoisoned catalyst, although further metals content may be removed by repeated or other treatments. Inert gases frequently may be employed after contact with reactive vapors to remove any of these vapors entrained in the catalyst or to purge the catalyst of reaction products. Any given step in the demetallization treatment is usually conduced under conditions, including residence time of the catalyst, sufficient to effect a substantial conversion or removal of poisoning metal and ultimately results in a substantial increase in metals removal compared with that which would have been removed if the particular step had not been performed. The actual residence time, extent of treating, etc., depends on the demetallization efficiency needed in any particular situation for keeping the sum of the tons of catalyst lost from the system per day and the product of the tons of catalyst removed from conversion and demetallized per day times the efficiency of nickel removal in the demetallization within the limits of about 0.8 to 8 times the number of pounds of nickel introduced with the feedstock to the conversion each day, measured as nickel oxide. A further significant advantage of the demetallization rate described is that it performs an effective overall metals removed while not "overtreating" the catalyst, a practice which could unduly deleteriously affect the activity, selectivity, pore structure and other desirable characteristics of the catalyst.

The present invention will be further described with reference to the following examples which are not to be considered limiting.

*Example I*

A fluidizing catalytic cracking unit is set up having a capacity to crack 11,152 barrels per day of a feedstock comprising a blend of Wyoming and Mid-Continent gas oils containing about 1.73 p.p.m. vanadium, about 0.31 p.p.m. nickel, about 0.60 p.p.m. iron and about 2 weight percent sulfur. This gas oil blend had a gravity (API) of 24°, a carbon residue of about 0.3 weight percent and a boiling range of about 500 to 1000° F. The cracking system includes an air regenerator and holds a catalyst inventory of about 70 tons of a "Nalcat" synthetic gel silica-alumina finely divided fluid-type cracking catalyst composed of about 25% $Al_2O_3$, substantially the rest $SiO_2$. The catalyst lost from the system averaged about 0.5 ton a day. In the cracker, feed is contacted with catalyst at a temperature of about 925° F. and a pressure of about 5 p.s.i.g., at a weight hourly space velocity of about 3.5. The cracked products are introduced to a fractionator where a 75% yield of gasoline and other desired components based on the feed to the cracker are removed. The residue is recycled to the cracker for further processing. A portion of the silica-alumina catalyst is continually removed from the cracking reactor at about 15,000 tons per day rate to a regenerator and held in a free oxygen-containing gas for an average residence time of about 5 minutes at a temperature of about 1100° F. and then returned to the reactor. The catalyst has an average metals level of about 223 p.p.m. NiO, 3000 p.p.m. $V_2O_5$ and 2300 p.p.m. Fe.

The conversion apparatus is supplemented by a demetallization unit in which catalyst is subjected first to magnetic flux for removal of tramp iron then conveyed to a sulfider where it is subjected to the action of $H_2S$ gas for an average residence time of about four hours at 1050° F. and then removed to a chamber where it is slurried for about an average of 60 minutes in an aqueous solution having a pH of about 3–5 and provided with 25.7 pounds $HNO_3$ and 40 pounds $H_2O_2$ per ton of catalyst. The slurry contains an average of 20% solids and generally has a temperature of about 212° F. A slurry of catalyst in this wash medium is continuously removed from the chamber and sent to drying and calcination in air for 2½ hours at about 1050° F., then sent to a second sulfiding and slurrying under the same conditions for a repetition of the entire treatment. After the second treatment the catalyst is returned to the cracking system with a metals content of about 1587 p.p.m. Fe, 68 p.p.m. NiO and 2260 p.p.m. $V_2O_5$ an efficiency of about 69.4% for nickel removal, 24.6% for vanadium removal and 30.8% for iron removal. The demetallization unit is provided with the capacity to treat about 5 tons of catalyst per day. The system is operated at this demetallization rate, which satisfies the relationships:

$$\frac{0.0026nF-D}{e} > 5 > \frac{0.00026nF-D}{e}; 12 > 5 > 0.6$$

$$5 = \frac{D}{e} + \frac{nF}{e}(.00143+B); B = -0.00057$$

$$\sim 8A \geq D+5e \geq \sim 0.8A; 8.84 > 3.97 > .884$$

The catalyst circulation rate as measured at a point in the regenerator standpipe is about eight times the weight of the oil feed; 15,000 tons per day or 600 tons per hour. Thus, the demetallization rate represents 0.03 weight percent of total daily catalyst circulation rate.

*Example II*

Another installation used as a feed 10,600 barrels per day of a 40% reduced North Texas petroleum crude having an API gravity of about 22, a Conradson carbon of about 5 weight percent, a viscosity of about 100 seconds Saybolt Universal at 210° F., and an initial boiling point above about 650° F. at atmospheric pressure, containing 25.0 p.p.m. of nickel, 60 p.p.m. of vanadium and 19.6 p.p.m. of iron. The feed is preheated to about 300° F., and introduced into a first stage cracker, mixed with a finely divided cracking catalyst and about 100 lbs. steam/bbl. residual feed for dispersion and stripping. The catalyst introduced into the feed line is a "Nalcat" synthetic gel cracking catalyst containing 25% $Al_2O_3$, the balance silica, and having fluidizable particle size. Total catalyst in the system is about 150 tons and about 1.5 tons are lost each day. Cracking conditions include a temperature of about 900 to 925° F., a pressure of about 5 p.s.i.g.; and a WHSV of about 0.1 to 3. Catalyst circulation rate through the regenerator standpipe is 14 times the weight of oil feed or 998 tons per hour. The cracked products from the cracker are introduced to a fractionator where a 60% yield of gasoline and other desired components based on the feed to the cracker are removed. The above-noted 998 tons of catalyst are sent to the regenerator each hour where catalyst is contacted with air at 1050° F. to burn off the carbon. A side stream of regenerated catalyst having a carbon content of about 0.4%, 475 p.p.m. nickel, 3768 p.p.m. vanadium and 2378 p.p.m. iron is continuously removed from the regenerator at a rate of about 118 tons daily and sent to the demetallization unit. In the demetallization unit the catalyst is first held for about an hour in contact with air at about 1300° F. and then sent to a sulfiding zone where it is fluidized with $H_2S$ gas at a temperature of about 1100° F. for about an hour. The catalyst is then purged with flue gas at a temperature of about 575° F. and chlorinated in a chlorination zone with an equimolar mixture of $Cl_2$ and $CCl_4$ at about 600° F. After about 1 hour average hold up time in the chlorination reactor, catalyst is immersed in water. A pH of about 2 is imparted to this wash medium by chlorine entrained in the catalyst and the wash serves to remove nickel chloride.

The catalyst, substantially reduced in iron, nickel and vanadium content, is filtered from the wash slurry, dried at about 350° F. and returned to the regenerator. The treated catalyst is analyzed and shows a metals content of 190 p.p.m. nickel, 2750 p.p.m. vanadium and 1853 p.p.m. iron, a reduction of about 60% in nickel, 27% in vanadium and 22% in iron.

We claim:

1. In a method for the catalytic conversion of a hydrocarbon feedstock containing a nickel contaminant by contact of the feedstock at an elevated temperature with a synthetic gel silica catalyst and wherein nickel deposits on the catalyst, continuously removing catalyst from the conversion system and demetallizing the catalyst at a rate such as to satisfy the relationship $$\frac{1}{e}(0.0026nF-D) \geqq T \geqq \frac{1}{e}(0.00026nF-D)$$

where

D is the tons of catalyst lost from the system per day, e is the fraction of NiO removed from the catalyst in demetallization, F is the barrels of fresh feed sent to the conversion unit per day, n is the parts per million of NiO in the feed, and T is the tons of catalyst demetallized per day, said rate being about 0.01 to 0.5% of the catalyst circulation rate, and returning the catalyst to the conversion reaction.

2. The method of claim 1 in which the hydrocarbon feedstock contains Ni, V, and Fe.

References Cited in the file of this patent

UNITED STATES PATENTS

| | | |
|---|---|---|
| 2,575,258 | Corneil et al. | Nov. 13, 1951 |
| 2,580,004 | Corneil | Dec. 25, 1951 |
| 2,614,068 | Healy et al. | Oct. 14, 1952 |
| 2,656,305 | Viland | Oct. 20, 1953 |
| 2,668,798 | Plank | Feb. 9, 1954 |
| 2,681,305 | Sweetser | June 15, 1954 |
| 2,693,455 | Smith et al. | Nov. 2, 1954 |